United States Patent
Sutherland et al.

(10) Patent No.: US 10,660,141 B2
(45) Date of Patent: May 19, 2020

(54) COMMUNICATION LINK ESTABLISHMENTS VIA IDENTIFIERS

(71) Applicant: Hewlett-Packard Development Company, L.P., Houston, TX (US)

(72) Inventors: Michael Sutherland, Palo Alto, CA (US); Robert Campbell, Cupertino, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 11 days.

(21) Appl. No.: 15/762,027

(22) PCT Filed: Nov. 19, 2015

(86) PCT No.: PCT/US2015/061515
§ 371 (c)(1),
(2) Date: Mar. 21, 2018

(87) PCT Pub. No.: WO2017/086964
PCT Pub. Date: May 26, 2017

(65) Prior Publication Data
US 2018/0270874 A1     Sep. 20, 2018

(51) Int. Cl.
*H04W 12/06* (2009.01)
*H04W 76/10* (2018.01)
(Continued)

(52) U.S. Cl.
CPC ............. *H04W 76/10* (2018.02); *H04L 29/06* (2013.01); *H04L 29/08* (2013.01); *H04L 67/10* (2013.01);
(Continued)

(58) Field of Classification Search
CPC ................................. H04W 76/10; H04W 4/80
See application file for complete search history.

(56) References Cited

U.S. PATENT DOCUMENTS 8,428,261 B2 *   4/2013   Schneider ............. H04W 12/06
                                                             380/270
8,495,072 B1     7/2013   Kapoor et al.
(Continued)

FOREIGN PATENT DOCUMENTS

CN           103944925 A      7/2014
EP              1633104       3/2006
(Continued)

OTHER PUBLICATIONS

Carr M., "Mobile Payment Systems and Services", Nov. 1, 2007, 12 pages.

(Continued)

*Primary Examiner* — Tuan H Nguyen
(74) *Attorney, Agent, or Firm* — HP Inc. Patent Department

(57) ABSTRACT

Example implementations relate to establishing communication Sinks with electronic devices. As an example, a computing device includes a data acquisition device to obtain global unique identifier (GUID) of an electronic device using a first communication protocol. The computing device also includes a processor to authenticate the electronic device based on the GUiD. The processor is also to determine device characteristic information associated with the electronic device based on the GUID. The processor is further to establish a communication link with the electronic device based on the device characteristic information and the GUID, The communication link is implemented based on a second communication protocol that is different from the first communication protocol.

15 Claims, 4 Drawing Sheets

(51) Int. Cl.
*H04L 29/06* (2006.01)
*H04L 29/08* (2006.01)
*H04W 4/80* (2018.01)

(52) U.S. Cl.
CPC ............ *H04L 67/303* (2013.01); *H04L 69/14* (2013.01); *H04L 69/18* (2013.01); *H04L 69/24* (2013.01); *H04W 4/80* (2018.02); *H04L 63/08* (2013.01); *H04L 67/12* (2013.01)

(56) References Cited

U.S. PATENT DOCUMENTS

| | | |
|---|---|---|
| 2009/0170431 A1 | 7/2009 | Pering |
| 2009/0240726 A1 | 9/2009 | Carter et al. |
| 2012/0306622 A1 | 12/2012 | Trinh et al. |
| 2012/0327815 A1 | 12/2012 | Cassanova et al. |
| 2013/0152183 A1 | 6/2013 | Plewnia et al. |
| 2013/0215467 A1 | 8/2013 | Fein et al. |
| 2013/0303085 A1 | 11/2013 | Boucher et al. |
| 2013/0333055 A1 | 12/2013 | Pallakoff et al. |
| 2014/0244833 A1* | 8/2014 | Sharma ................... H04L 67/16 709/224 |
| 2014/0295761 A1 | 10/2014 | Lo |
| 2014/0342670 A1 | 11/2014 | Kang et al. |
| 2015/0002872 A1 | 1/2015 | Naruse |
| 2015/0111500 A1 | 4/2015 | Koh et al. |
| 2015/0181425 A1 | 6/2015 | Amano |

FOREIGN PATENT DOCUMENTS

| | | |
|---|---|---|
| FR | 2944177 | 10/2010 |
| JP | 2015-029262 | 2/2015 |
| JP | 2015-126300 | 7/2015 |

OTHER PUBLICATIONS

Insteon, Insteon now works with Google Assistant, Available online at: < http://www.insteon.com > Retrieved from the Internet on Mar. 19, 2018.

Lutron Electronics, Available online at: < http://www.lutron.com/en-US/Pages/default.aspx > Retrieved from the Internet on Mar. 19, 2018.

* cited by examiner

COMMUNICATION LINK ESTABLISHMENTS VIA IDENTIFIERS

BACKGROUND

Internet of Things (IoT) is a concept of having a network of objects that collect and exchange information. The objects may include a plurality of devices, such as a light bulb, a fridge, etc.

BRIEF DESCRIPTION OF THE DRAWINGS

Some examples of the present application are described with respect to the following figures.

DETAILED DESCRIPTION

A communication link with an Internet of Things (IoT) device may be established before the data is collected and/or exchanged. Currently, establishing a communication link between an IoT device and a computing device is a manual process where the user inputs information about the device into a computing device. Then the user initiates a discovery process at the computing device to search for the device in order to establish the communication link. Thus, establishing a communication link between a computing device and an IoT device may be a time consuming experience.

Examples described herein provide a computing device to establish a communication link between an electronic device and the computing device based on an identifier of the electronic device. For example, a computing device may include a data acquisition device to obtain global unique identifier (GUID) of an electronic device using a first communication protocol. The computing device may also include a processor to authenticate the electronic device based on the GUID. The processor may also determine device characteristic information associated with the electronic device based on the GUID. The processor may further establish a communication link with the electronic device based on the device characteristic information and the GUID. The communication link may be implemented based on a second communication protocol that is different from the first communication protocol. Thus, the time associated with establishing a communication link with an electronic device may be reduced.

Figure 1:
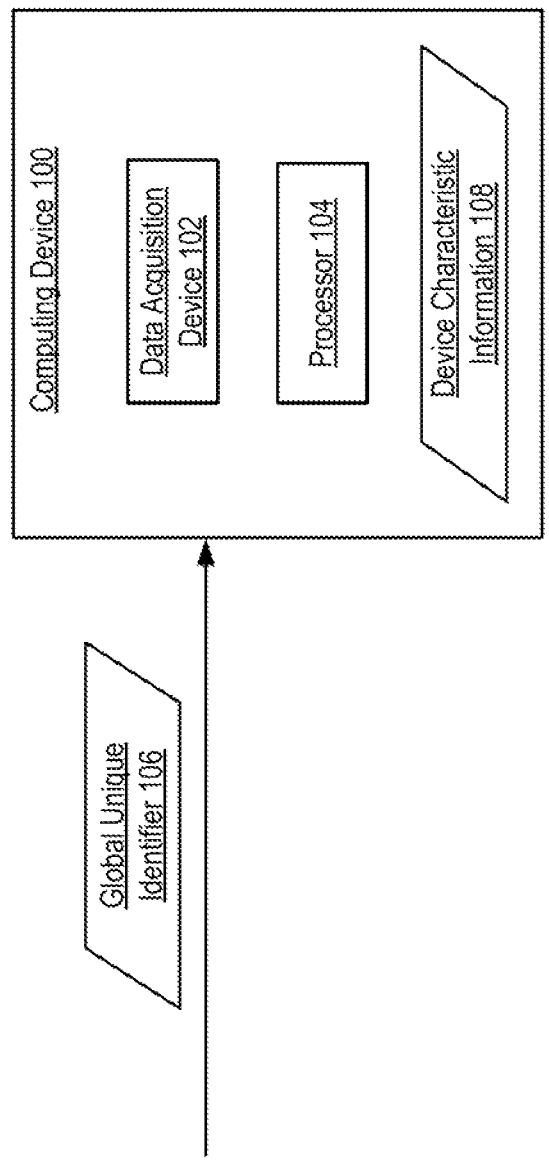
FIG. 1 illustrates a computing device to establish a communication link between an electronic device and the computing device based on an identifier of the electronic device, according to an example.

FIG. 1 illustrates a computing device 100 to establish a communication link between an electronic device and computing device 100 based on an identifier of the electronic device, according to an example. Computing device 100 may be, for example, a web-based server, a local area network server, a cloud-based server, a notebook computer, a desktop computer, an all-in-one system, a tablet computing device, a mobile phone, an electronic book reader, or any other electronic device suitable to establish a communication link with an electronic device via an identifier of the electronic device. Computing device 100 may include a data acquisition device 102 and a processor 104.

Data acquisition device 102 may be any device or circuit that energizes another device in order to obtain data from the other device via a first data communication protocol. For example, data acquisition device 102 may energize another device via magnetic induction. In some examples, data acquisition device 102 may be a Near Field Communication (NFC) reader that implements an NFC protocol. Processor 104 may fetch, decode, and execute instructions to control the operations of computing device 100.

During operation, data acquisition device 102 may obtain a global unique identifier (GUID) 106 from an electronic device (not shown in FIG. 1). Data acquisition device 102 may use the NFC protocol to obtain GUID 106. The electronic device may be an IoT device. GUID 106 may contain information about the identity of the electronic device.

In response to obtaining GUID 106, computing device 100 may authenticate the identity of the electronic device based on GUID 106. Computing device 100 may also determine device characteristic information 108 associated with the electronic device. Device characteristic information 108 may contain information about at least one operational aspect of the electronic device. Based on device characteristic information 108, computing device 100 may establish a communication link with the electronic device. The communication link may be implemented via a second communication protocol that is different from the first communication protocol. Thus, computing device 100 and the electronic device may exchange data via the communication link after the communication link is established. Establishing a communication link between a computing device and an electronic device is described in more detail in FIG. 2.

Figure 2:
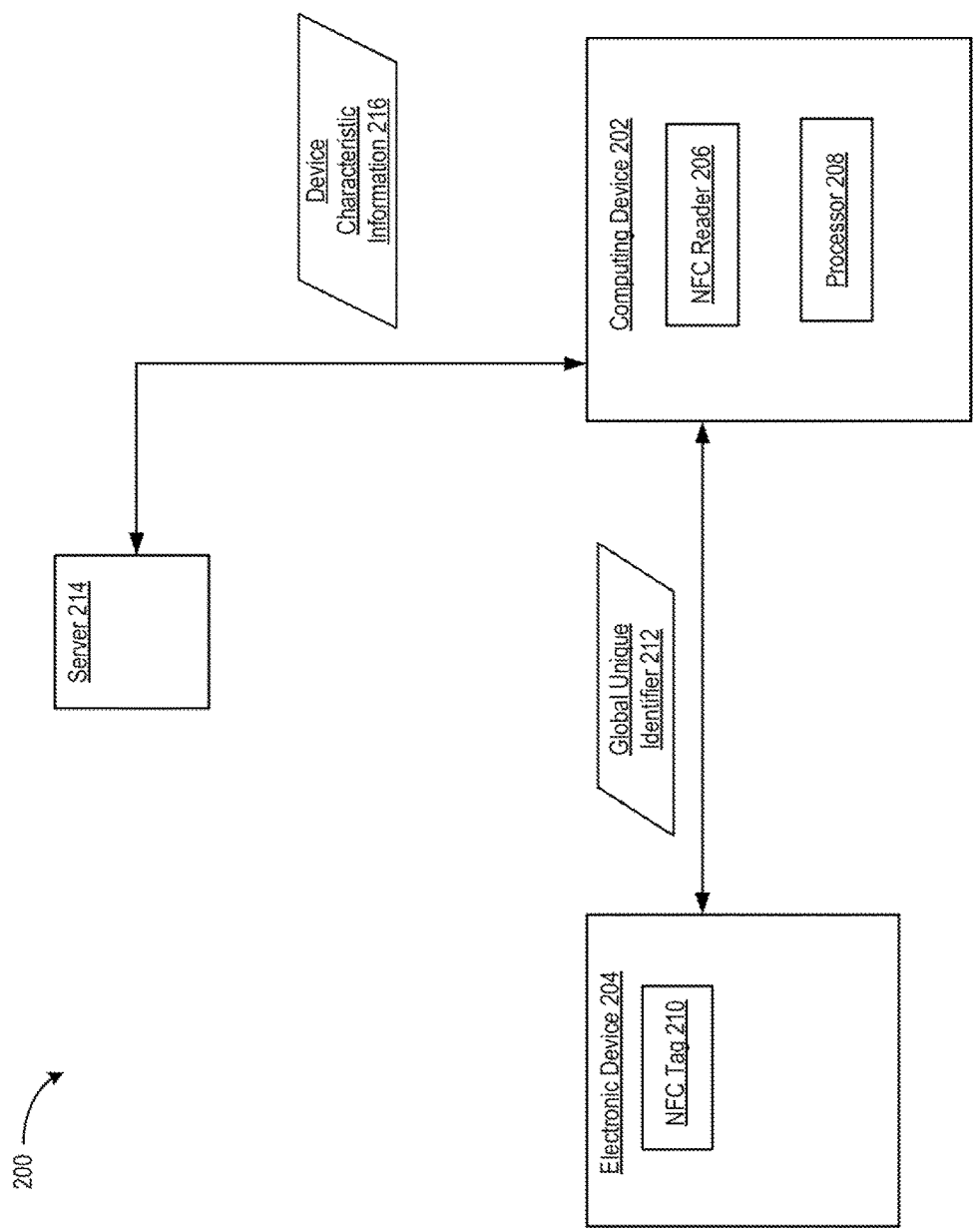
FIG. 2 illustrates a system to establish a communication link between an electronic device and a computing device based on an identifier of the electronic device, according to an example.

FIG. 2 illustrates a system 200 to establish a communication link between an electronic device and a computing device based on an identifier of the electronic device, according to an example. System 200 may include a computing device 202 and an electronic device 204. Computing device 202 may be similar to computing device 100 of FIG. 1.

Computing device 202 may include an NFC reader 206 and a processor 208. NFC reader 206 may be any device or circuit that obtains or reads data from an NFC tag using an NFC protocol, such as ECMA-340. Electronic device 204 may be any device or circuit that performs a control operation (e.g., turning a light on and off) and/or a sensing operation (e.g., temperature sensing) and can exchange information via a wired or wireless communication link. Processor 208 may be similar to processor 104 of FIG. 1. Processor 208 may control operations of computing device 202.

Electronic device 204 may be, for example, a sensor, an appliance, etc. Electronic device 204 may include an NFC tag 210. NFC tag 210 may store information associated with electronic device 204. For example, NFC tag 210 may store a global unique identifier (GUID) 212 associated with electronic device 204.

GUID 212 may be a media access control (MAC) address associated with electronic device 204, an Internet protocol (IP) address assigned to electronic device 204, an operating system generated identifier associated with electronic device 204, a hash of a serial number associated with electronic device 204 and a time stamp, or a combination thereof. In some examples, GUID 212 may be associated with a communication protocol that electronic device 204 implements to communicate with computing device 202. That is, GUID 212 may depend on the communication protocol. For example, when the communication protocol is a Thread protocol, GUID 212 may be an IPv6 address assigned to electronic device. As another example, when the communication protocol is a ZigBee protocol, GUID 212 may be a MAC address associated with electronic device 204.

During operation, computing device 202 may obtain GUID 212 from electronic device 204 via NFC reader 206. When electronic device 204 taps computing device 202 (i.e., electronic device 204 makes physical contact with computing device 202) or is within a particular distance to computing device 202, NFC reader 206 may energize NFC tag 210 via magnetic induction to read GUID 212.

In response to obtaining GUID 212, computing device 202 may authenticate the identity of electronic device 204 based on GUID 212. In some examples, computing device 202 may transmit. GUID 212 to a server 214 to perform the authentication. In response to a determination that electronic device 204 is authenticated, server 214 may retrieve or generate device characteristic information 216 associated with electronic device 204. Server 214 may transmit device characteristic information 216 to computing device 202. Device characteristic information 216 may describe an aspect of electronic device 204. Examples of device characteristic information 216 are described below.

Computing device 202 may set up and establish a communication link with electronic device 204 based on device characteristic information 216 and GUID 212. For example, computing device 202 may use device characteristic information 216 to configure the communication link. Computing device 202 may use GUID 212 as a credential of electronic device 204 for the communication link. Once the communication link is established, computing device 202 and electronic device 204 may exchange data via the communication link. By enabling computing device 202 to obtain GUID 212 from electronic device 204 and setting the communication link automatically, the process of establishing the communication link can be performed without any input from a user of electronic device 204 or computing device 202. Thus, the amount of time associated with establishing the communication link may be reduced.

Device characteristic information 216 may be a device type of electronic device 204, a communication protocol supported by electronic device 204, a sensing capability of electronic device 204, a control capability of electronic device 204, or a combination thereof. Device type of electronic device 204 may indicate whether electronic device 204 is a sensor, an appliance, or another type of device. Communication protocol may be a communication protocol that electronic device 204 and computing device 202 use to exchange data. For example, the communication protocol may be a Z-Wave protocol, a Bluetooth protocol, a Zigbee protocol, or a Thread protocol.

In some examples, electronic device 204 may be powered off before the communication link is established and may be powered on to exchange data with computing device 202 after the communication link is established.

Figure 3:
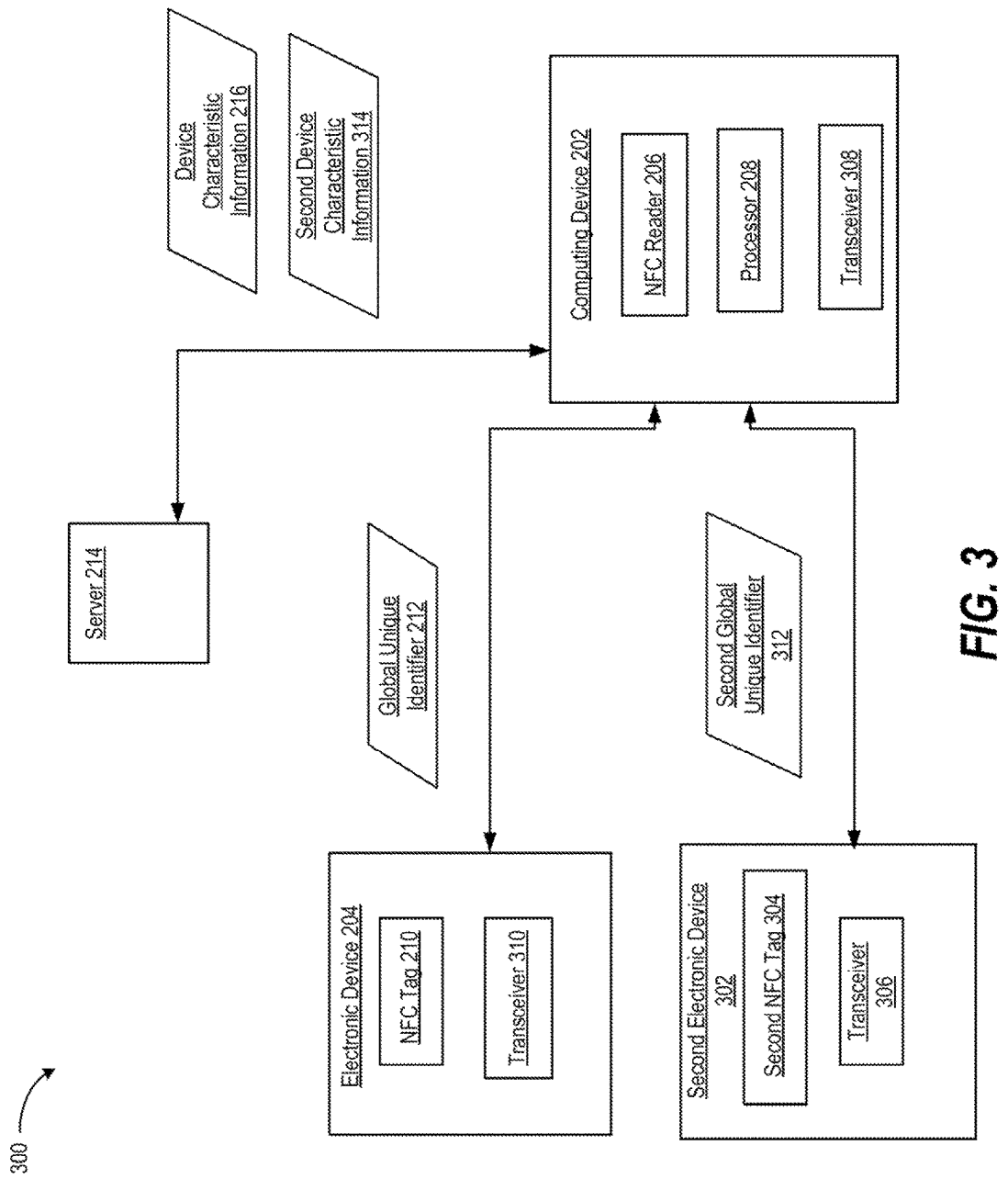
FIG. 3 illustrates a system to establish a communication link between an electronic device and a computing device based on an identifier of the electronic device, according to another example.

FIG. 3 illustrates a system 300 to establish a communication link between an electronic device and a computing device based on an identifier of the electronic device, according to another example. System 300 may include computing device 202, electronic device 204, and a second electronic device 302. Second electronic device 302 may be similar to electronic device 204. Second electronic device 302 may include a second NFC tag 304 and a transceiver 306. Computing device 202 and electronic device 204 may also include a transceiver 308 and 310, respectively.

In some examples, transceiver 310 may implement a first communication protocol. Second transceiver 306 may implement a second communication protocol that is different from the first communication protocol. Transceiver 308 may implement a plurality of communication protocols including the first communication protocol and the second communication protocol. As an example, the first communication protocol may be a Bluetooth protocol and the second communication protocol may be a Z-wave protocol.

During operation, computing device 202 may establish a Bluetooth communication link with electronic device 204 based on GUID 212 and device characteristic information 216 as described in FIG. 2. After the first communication link is established, computing device 202 and electronic device 204 may exchange data using the Bluetooth communication link via transceiver 308 and 310, respectively.

Computing device 202 may obtain a second GUID 312 from second electronic device 302 via the NFC protocol. Second GUID 312 may be stored in second NFC tag 304. In response to obtaining second GUID 312, computing device 202 may authenticate second electronic device 302 based on second GUID 312. For example, computing device 202 may transmit second GUID 312 to server 214 for authentication.

In response to a determination that second electronic device 302 is authenticated, computing device 202 may determine second device characteristic information 314 based on second GUID 312. For example, server 214 may retrieve or generate second device characteristic information 314 associated with second electronic device 302 based on second GUID 312. Server 214 may transmit second device characteristic information 314 to computing device 202.

Based on second GUID 312 and second device characteristic information 314, computing device 202 may set up and establish Z-wave communication link with second electronic device 302. When the Z-wave communication link is established, computing device 202 and second electronic device 302 may exchange data via transceiver 308 and 306, respectively.

Figure 4:
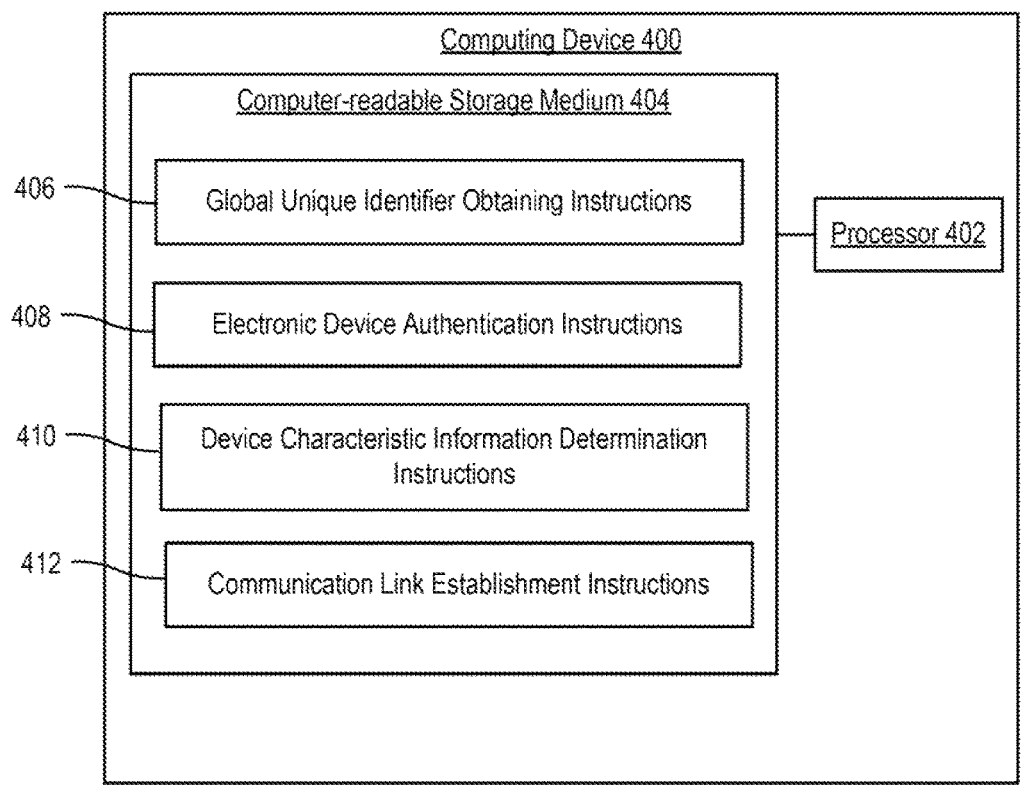
FIG. 4 illustrates a computing device to establish a communication link with an electronic device based on an identifier of the electronic device, according to another example.

FIG. 4 illustrates a computing device 400 to establish a communication link with an electronic device based on an identifier of the electronic device, according to another example. Computing device 400 may include a processor 402 and a computer-readable storage medium 404. Computing device 400 may implement computing device 100 of FIG. 1 and/or computing device 202 of FIGS. 2-3.

Processor 402 may be a central processing unit (CPU), a semiconductor-based microprocessor, and/or other hardware devices suitable for retrieval and execution of instructions stored in computer-readable storage medium 404. Processor 402 may fetch, decode, and execute instructions 406, 408, 410, and 412 to control a process of establishing a communication link with an electronic device based on an identifier of the electronic device. As an alternative or in addition to retrieving and executing instructions, processor 402 may include at least one electronic circuit that includes electronic components for performing the functionality of instructions 406, 408, 410, 412, or a combination thereof.

Computer-readable storage medium 404 may be any electronic, magnetic, optical, or other physical storage device that contains or stores executable instructions. Thus, computer-readable storage medium 404 may be, for example, Random Access Memory (RAM), an Electrically Erasable Programmable Read-Only Memory (EEPROM), a storage device, an optical disc, etc. In some examples, computer-readable storage medium 404 may be a non-transitory storage medium, where the term "non-transitory" does not encompass transitory propagating signals. As described in detail below, computer-readable storage medium 404 may be encoded with a series of processor executable instructions 406, 408, 410, and 412.

Global unique identifier obtaining instructions 406 may obtain a GUID from an electronic device. For example, referring to FIG. 2, computing device 202 may obtain GUID 212 from electronic device 204 via NFC reader 206. Electronic device authentication 408 may authenticate an electronic device based on the GUID of the electronic device. For example, computing device 202 may transmit GUID 212 to a server 214 to perform the authentication.

Device characteristic information determination instructions 410 may determine device characteristic information of the electronic device based on the GUID. For example, referring to FIG. 2, in response to a determination that electronic device 204 is authenticated, server 214 may retrieve or generate device characteristic information 216 associated with electronic device 204. Server 214 may transmit device characteristic information 216 to computing device 202. Communication link establishment instructions 412 may establish a communication link between computing device 400 and the electronic device based on the device characteristic information associated with the electronic device and the GUID. For example, referring to FIG. 2, computing device 202 may set up and establish a communication link with electronic device 204 based on device characteristic information 216 and GUID 212.

The use of "comprising", "including" or "having" are synonymous and variations thereof herein are meant to be inclusive or open-ended and do not exclude additional unrecited elements or method steps.

What is claimed is:

1. A computing device comprising:
    a data acquisition device to obtain global unique identifier (GUID) of an electronic device using a first communication protocol, wherein the GUID identifies the electronic device;
    a processor to:
        authenticate, without any input from a user, the electronic device based on the GUID;
        determine device characteristic information associated with the electronic device based on the GUID; and
        establish a communication link with the electronic device based on the device characteristic information and the GUID, wherein the communication link is implemented based on a second communication protocol that is different from the first communication protocol.

2. The computing device of claim 1, wherein the first communication protocol includes a Near Field Communication (NFC) protocol.

3. The computing device of claim 1, wherein the second communication protocol is a Z-Wave protocol, a Bluetooth protocol, a Zigbee protocol, or a Thread protocol.

4. The computing device of claim 1, wherein the data acquisition device is to obtain the GUID when the electronic device is powered off.

5. The computing device of claim 1 wherein the device characteristic information is a device type of the electronic device, a communication protocol supported by the electronic device, a sensing capability of the electronic device, a control capability of the electronic device, or a combination thereof.

6. A system comprising:
    an electronic device including a Near Field Communication (NFC) tag to store a global unique identifier (GUID) of the electronic device, wherein the GUID identifies the electronic device; and
    a computing device including:
        a NFC reader to obtain the global unique identifier from the electronic device via a NFC protocol; and
        a processor to:
            authenticate, without any input from a user, the electronic device with a server based on the GUID;
            receive device characteristic information associated with the electronic device from the server; and
            establish a communication link based on the device characteristic information and the GUID, wherein the communication link is implemented based on a communication protocol different from the NFC protocol.

7. The system of claim 6, wherein the GUID is a media access control (MAC) address associated with the electronic device, an Internet protocol (IP) address, an operating system generated identifier, a hash of a serial number associated with the electronic device and a time stamp, or a combination thereof.

8. The system of claim 6, wherein the electronic device is powered off when the communication link is established, and wherein the electronic device is to communicate with the computing device via the communication link upon powering on.

9. The system of claim 6, wherein the communication protocol is a Z-Wave protocol, a Bluetooth protocol, a Zigbee protocol, or a Thread protocol.

10. The system of claim 6, further comprising a second electronic device including a second NFC tag to store a second GUID of the second electronic device, wherein the computing device is to establish a second communication link with the second electronic device based on the second GUID, and wherein the second communication link is implemented based on a second communication protocol that is different from the communication protocol.

11. A non-transitory computer-readable storage medium comprising instructions that when executed cause a processor of a computing device to:
    obtain a global unique identifier (GUID) of an electronic device using a first communication protocol, wherein the GUID is associated with a second communication protocol that is different from the first communication protocol; and the GUID identifies the electronic device;
    authenticate, without any input from a user, the electronic device based on the GUID;
    determine device characteristic information associated with the electronic device based on the GUID; and
    establish a communication link with the electronic device based on the device characteristic information and the GUID, wherein the communication link is implemented based on the second communication protocol.

12. The non-transitory computer-readable storage medium of claim 11, wherein the first communication protocol includes a Near Field Communication (NFC) protocol.

13. The non-transitory computer-readable storage medium of claim 11, wherein the second communication protocol is a Z-Wave protocol, a Bluetooth protocol, a Zigbee protocol, or a Thread protocol.

14. The non-transitory computer-readable storage medium of claim 11, wherein the GUID is a media access control (MAC) address associated with the electronic device, wherein the GUID is a media access control (MAC)

address associated with the electronic device, an Internet protocol (IP) address, an operating system generated identifier, a hash of a serial number associated with the electronic device and a time stamp, or a combination thereof.

15. The non-transitory computer-readable storage medium of claim 11, wherein the device characteristic information is a device type of the electronic device, a communication protocol supported by the electronic device, a sensing capability of the electronic device, a control capability of the electronic device, or a combination thereof.

* * * * *